United States Patent [19]
Tsubouchi et al.

[11] Patent Number: 5,845,556
[45] Date of Patent: Dec. 8, 1998

[54] VACUUM BRAKE BOOSTER

[75] Inventors: Kaoru Tsubouchi, Toyota; Akihiko Miwa, Anjyo; Hiroaki Aizawa, Kariya, all of Japan

[73] Assignee: Aisin Seiki Kabushiki Kaisha, Kariya, Japan

[21] Appl. No.: 769,273

[22] Filed: Dec. 18, 1996

[30] Foreign Application Priority Data

Dec. 18, 1995 [JP] Japan .................................. 7-329252

[51] Int. Cl.⁶ .............................. B60T 8/44; B60T 13/57; B60T 13/68
[52] U.S. Cl. ............................. 91/367; 91/376 R
[58] Field of Search ................................ 91/367, 376 R

[56] References Cited

U.S. PATENT DOCUMENTS

| | | | |
|---|---|---|---|
| 4,633,757 | 1/1987 | Kubota | 91/387 |
| 5,350,224 | 9/1994 | Nell et al. | 91/376 R |
| 5,460,074 | 10/1995 | Balz et al. | 91/376 R |

FOREIGN PATENT DOCUMENTS 43 24 688  1/1995  Germany .

OTHER PUBLICATIONS

Rath et al., "Effective Active Safety to Reduce Road Accidents", SAE International Congress and Exposition, 1995, pp. 35–42.

*Primary Examiner*—Sheldon J. Richter
*Attorney, Agent, or Firm*—Burns, Doane, Swecker & Mathis, LLP

[57] ABSTRACT

A vacuum brake booster with an automatic braking actuation system of the type which includes an electric actuator assembled with a power piston to effect forward movement of a valve plunger assembly when activated under control of an electronic controller, wherein a depression amount of a brake pedal is detected to calculate a depression speed of the brake pedal based on the detected depression amount, and wherein the electric actuator is activated when the calculated depression speed of a brake pedal exceeds a predetermined threshold value and is deactivated when a release amount of the brake pedal is more than a predetermined value.

8 Claims, 5 Drawing Sheets

VACUUM BRAKE BOOSTER

BACKGROUND OF THE INVENTION

1. Field of the Invention

The present invention relates to a vacuum brake booster for automotive vehicles, and more particularly to a vacuum brake booster with an automatic braking actuation system.

2. Description of the Prior Art

Disclosed in SAE No. 950761 is a vacuum brake booster of the type which includes a housing the interior of which is subdivided into constant and variable pressure chambers by means of a movable wall assembled therein, a power piston carried by the movable wall for movement therewith, an input rod extended outwardly from th power piston for connection to a brake pedal to be axially inwardly moved by depression of the brake pedal, a valve plunger assembly axially slidably mounted within the power piston and engaged with the input rod, a control valve assembled within the power piston to cooperate with the valve plunger assembly for maintaining a communication between the constant and variable pressure chambers in a released condition of the brake pedal and for establishing a communication of the variable pressure chamber with the atmospheric air in operation of the brake booster, and a solenoid actuator assembled within the power piston in surrounding relationship with the valve plunger assembly to actuate the valve plunger assembly when energized by electric power under control of an electronic controller. An electronic actuator system for the brake booster comprises first detection means for detecting a displacement amount of the movable wall when the communication of the variable pressure chamber with the atmospheric air is automatically established by movement of the valve plunger assembly caused by energization of the solenoid actuator and second detection means assembled with the power piston for detecting displacement of the valve plunger assembly. The electronic controller is designed to energize the solenoid actuator when applied with a detection signal from the first detection means and to deenergize the solenoid actuator when applied with a detection signal from the second detection means.

Figure 7:
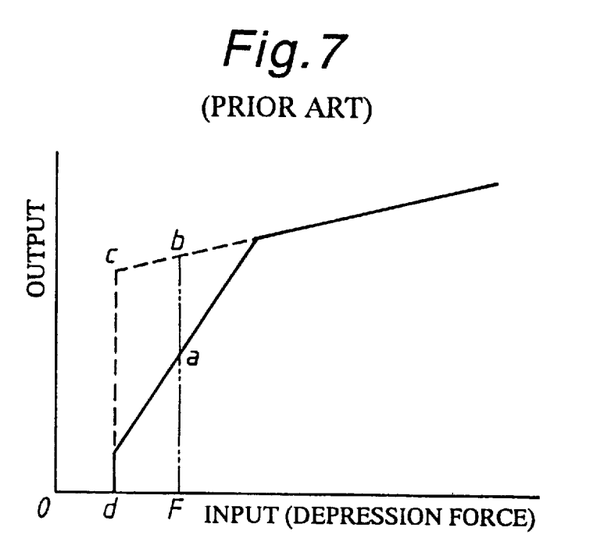
FIG. 7 is a graph illustrating an output characteristic of a conventional vacuum brake booster.

In FIG. 7 there are illustrated output characteristics of the vacuum brake booster in relation to a depression force of the brake pedal, wherein a solid line represents an output characteristic in normal braking operation while a broken line represents an output characteristic in automatic actuation of the brake booster. The valve plunger assembly of the brake booster is composed of a first valve plunger connected to the input rod for movement therewith and a second valve plunger engaged with the first valve plunger to be moved by the solenoid actuator When the input rod is moved axially inwardly by a depression force F of the brake pedal in braking operation, the first valve plunger is disengaged from the control valve to establish the communication of the variable pressure chamber with the atmospheric air. As a result, the power piston is moved by an output thrust force caused by a difference in pressure between the variable and constant pressure chambers. When the output of the brake booster becomes a level defined by a point "a" on the solid line, the communication of the variable pressure chamber with the atmospheric air is interrupted under control of the control valve in a condition where the communication between the constant and variable pressure chambers is being interrupted. In this instance, the displacement amount of the movable wall is detected by the first detection means, and the depression speed of the brake pedal is calculated on a basis of the detected displacement amount of the movable wall. If the depression speed of the brake pedal is higher than a predetermined value in emergency braking situations, the solenoid actuator is energized under control of the driving circuit to engage the second valve plunger with the control valve thereby to introduce the atmospheric air into the variable pressure chamber. As a result, the power piston is further moved by a thrust force caused by the difference in pressure between the constant and variable pressure chambers to increase the output of the brake booster up to a level defined by a point "b" in FIG. 7.

When the brake pedal is released in the emergency braking operation, the output of the brake booster decreases as shown by the broken line in FIG. 7. When the output of the brake booster becomes a level defined by a point "c", the driving circuit is activated under control of the second detection means to deenergize the solenoid actuator, and the second valve plunger is disengaged from the control valve to communicate the variable pressure chamber with the constant pressure chamber thereby to return the movable wall and power piston to their initial positions.

In the conventional brake booster disclosed in SAE No. 950761, it is, however, required to provide both the first and second detection means for detecting start and finish of the automatic braking actuation. This results in an increase of the manufacturing cost of the brake booster.

SUMMARY OF THE INVENTION

It is, therefore, a primary object of the present invention to provide a vacuum brake booster capable of controlling start and finish of the automatic braking actuation based on detection of a depression stroke of the brake pedal in a simple manner without providing the second detection means in the conventional brake booster described above.

According to the present invention, the object is accomplished by providing a vacuum brake booster which comprises a housing the interior of which is subdivided into constant and variable pressure chambers by means of a movable wall assembled therein, a power piston carried by the movable wall for movement therewith, an input rod extended outwardly from the power piston for connection to a brake pedal to be axially inwardly moved by depression of the brake pedal, a plunger assembly axially slidably mounted within the power piston and being operatively engaged with the input rod, control valve means assembled within the power piston and cooperable with the plunger assembly for communicating the variable pressure chamber with the constant pressure chamber and interrupting a communication of the variable pressure chamber with the atmospheric air in a released condition of the brake pedal and for establishing the communication of the variable pressure chamber with the atmospheric air and interrupting the communication of the variable pressure chamber with the constant pressure chamber in response to forward movement of the plunger assembly in operation of the brake pedal, and an electric actuator assembled within the power piston to effect forward movement of the plunger assembly when activated under control of an electronic controller, wherein the electric controller comprises detection means for detecting a depression amount of the brake pedal, calculation means for calculating a depression speed of the brake pedal based on the detected depression amount, and control means for activating the electric actuator when the calculated depression speed of the brake pedal exceeds a predetermined threshold value and for deactivating the electric actuator when a released amount of the brake pedal detected by the detection means is more than a predetermined value.

BRIEF DESCRIPTION OF THE DRAWINGS

Other objects, features and advantages of the present invention will be more readily appreciated from the following description of the preferred embodiments thereof when taken together with the accompanying drawings, in which.

DESCRIPTION OF THE PREFERRED EMBODIMENTS

Figure 1:
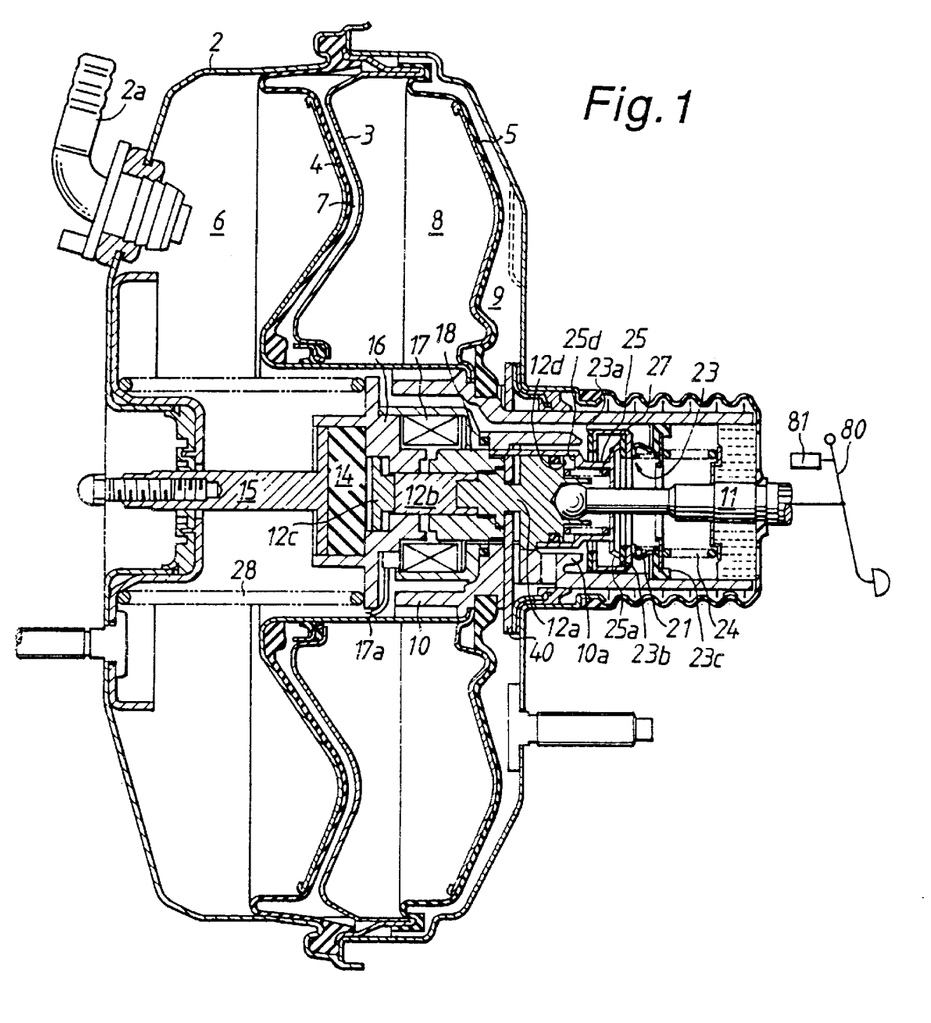
FIG. 1 is a sectional view of a preferred embodiment of a vacuum brake booster in accordance with the present invention.
Figure 2:
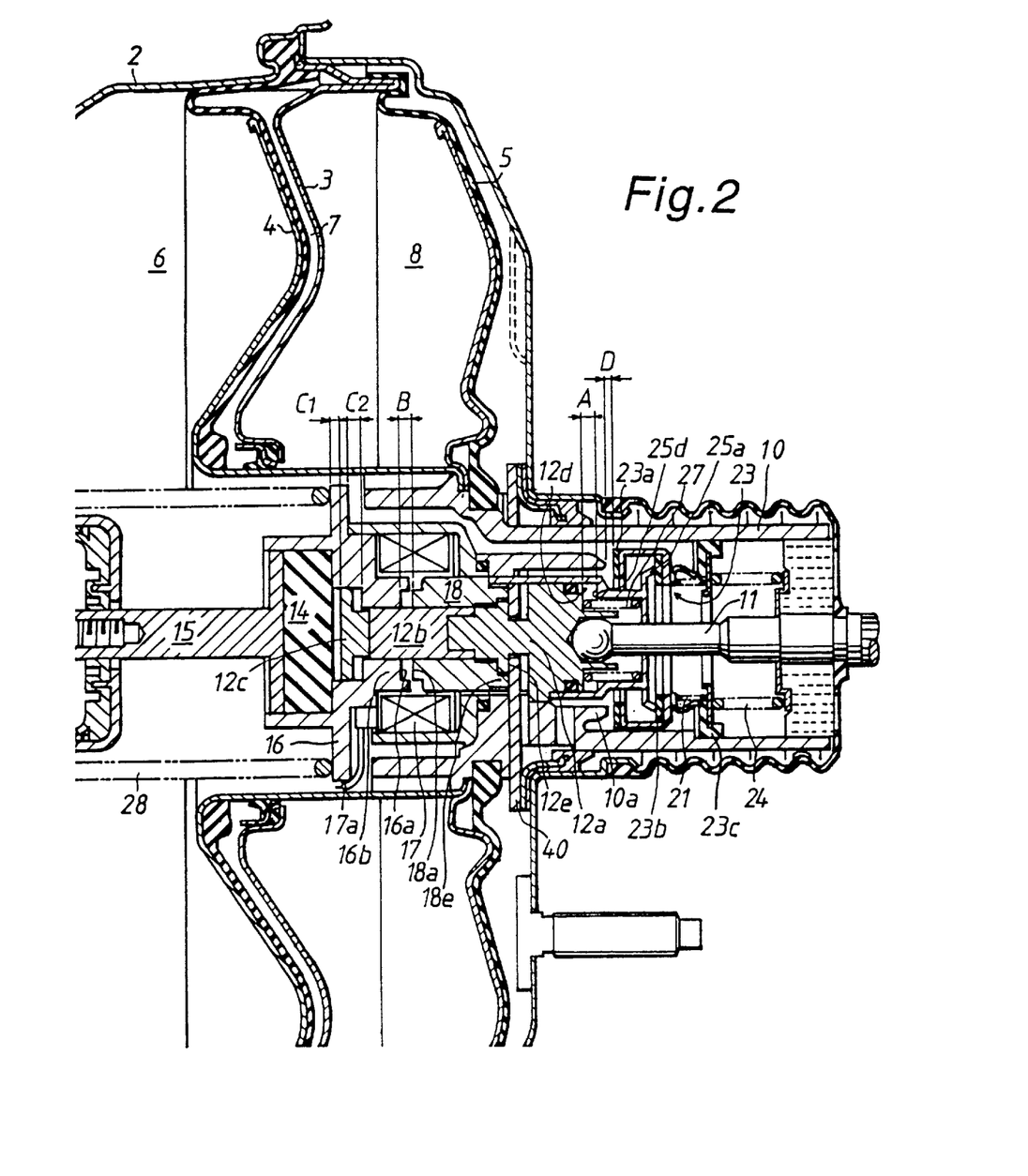
FIG. 2 is a partly enlarged sectional view of the brake booster shown in FIG. 1.

Illustrated in FIGS. 1 and 2 is a preferred embodiment of a vacuum brake booster for automotive vehicles in accordance with the present invention. A housing assembly 2 of the brake booster includes front and rear housing shells coupled at their opposed ends with each other in an air-tight manner. The interior of housing assembly 2 is subdivided into front and rear chambers by means of a partition wall member 3 which is hermetically coupled at its outer cylindrical periphery with the inner wall of the rear housing shell. A pair of front and rear movable walls 4 and 5 are respectively assembled within the front and rear chambers. The interior of the front chamber is subdivided into a constant pressure chamber 6 and a variable pressure chamber 7 by means of the front movable wall 4, while the interior of the rear chamber is subdivided into a constant pressure chamber 8 and a variable pressure chamber 9 by means of the rear movable wall 5. An inlet connector 2a is mounted on the upper portion of the front housing shell in an air-tight manner for connection to an intake manifold (not shown) of an internal combustion engine. The brake booster has a power piston 10 mounted within the housing assembly 2, and the rear housing shell is provided with a boot secured thereto in surrounding relationship with a rearward cylindrical portion of the power piston 10.

The front movable wall 4 is composed of an annular support plate fixed at its inner peripheral portion to an annular shoulder of power piston 10 and a diaphragm member attached to the rear face of the annular support plate. The annular support plate is axially slidably coupled with the partition wall 3 at its inner cylindrical portion to permit axial movement of the power piston 10. The diaphragm has an inner peripheral thick rim coupled over an annular shoulder of the support plate and an outer peripheral thick rim fixed to the inner wall of the front housing shell at its joint portion with the rear housing shell. When the variable pressure chamber 7 is applied with the atmospheric air, the front movable wall 4 is moved forward by a difference in pressure between the pressure chambers 6 and 7 to cause forward movement of the power piston 10. Similarly, the rear movable wall 5 is composed an annular support plate fixed at its inner peripheral portion to the annular shoulder of power piston 10 and a diaphragm member attached to the rear face of the annular support plate. The diaphragm member of rear movable wall 5 has an inner peripheral thick rim coupled over an annular stepped portion of power piston 10 and an outer peripheral thick rim fixed to a folded annular portion of partition wall member 3. When the variable pressure chamber 9 is applied with the atmospheric air, the rear movable wall 5 is moved forward by a difference in pressure between the pressure chambers 8 and 9 to cause forward movement of the power piston 10.

The variable pressure chambers 7 and 9 are normally communicated with each other through a passage (not shown) in a released condition of a brake pedal 80 and are selectively applied with the atmospheric air or interrupted therefrom under control of an air control valve 23 composed of valve elements 23b and 25a. The constant pressure chambers 6 and 8 are normally communicated with each other through a passage (not shown) and applied with a negative pressure from the intake manifold of the internal combustion engine in a released condition of the brake pedal 80. In braking operation, the constant pressure chambers 6 and 8 are selectively isolated from the variable pressure chambers 7 and 9 or communicated therewith under control of a vacuum control valve composed of a valve element 23a and a valve part 10a of power piston 10.

The brake booster is provided with an input rod 11 which is connected at its rear end to the brake pedal 80 and is operatively connected at its front end to the power piston 10. The boot is coupled with the rear end of power piston 10 to be deformed in accordance with forward movement of the power piston 10. An air filter is coupled within the cylindrical portion of power piston 10 in surrounding relationship with the input rod 11, and an annular retainer is fixed to the input rod 11.

The valve element 23a of the vacuum control valve is backed with an annular plate, and the valve element 23b of the air control valve is secured to an annular inward flange of a cylindrical member which is supported by a cylindrical deformable portion integrally formed with an annular retainer 23c made of elastomeric material. The annular plate is fixedly coupled with the cylindrical member to connect the valve element 23a with the valve element 23b. The annular retainer 23c is reinforced by an annular plate and fixed to the cylindrical portion of power piston 10. A compression coil spring 21 is disposed between the annular inward flange of the cylindrical member and the annular retainer 23c to bias the valve elements 23a and 23b toward the valve part 10a of power piston 10 and the valve element 25a. A return coil spring 24 is disposed between the annular retainer 23c and the annular retainer of input rod 11 to bias the input rod 11 outwardly.

Figure 3:
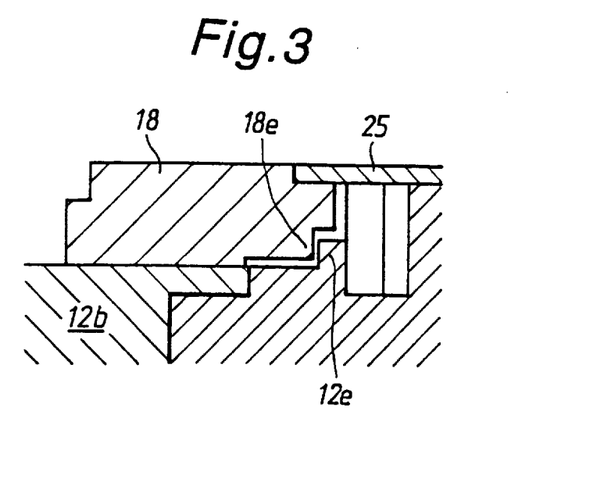
FIG. 3 is an enlarged sectional view of a portion of the brake booster shown in FIG. 2.

As clearly shown in FIG. 2, the valve element 25a is integrally formed with the rear end of a second cylindrical plunger 25 which is coaxially coupled with a first plunger 18 for movement therewith. The valve element 25a is normally engaged with the valve element 23b under load of a compression coil spring 27. The second cylindrical plunger 25 is formed therein with an annular abutment face 25d. The annular valve part 10a of power piston 10 is opposed to the valve element 23a for engagement therewith. Three input members 12a, 12b and 12c are coaxially assembled within the power piston 10. The first input member 12a is formed with an annular abutment face 12d opposed to the annular abutment face 25d of cylindrical plunger 25 and is formed with a cylindrical portion which is engaged with a spherical front end of input rod 11. The compression coil spring 27 is engaged at its one end with the annular abutment face 12d of first input member 12a and at its other end with the rear end of second cylindrical plunger 25. The first input member 12a is slidably coupled within the second cylindrical plunger 25. As clearly shown in FIG. 3, the first input member 12a is formed with an annular projection 12e which is slidably coupled with an annular recessed portion 18e of the first plunger 18. The first input member 12a is opposed to a stopper plate 40 fixed to the rear housing shell. Thus, when the input rod 11 and the first input member 12a are moved forward, the first and second plungers 18 and 25 are moved forward by engagement with the first input member 12a. In this instance, excessive forward movement of the first input member 12a is restricted by engagement with the stopper member 40. The second input member 12b is axially slidably assembled within the first plunger 18 and is coupled with the first input member 12a. The third input member 12c has a small diameter portion engaged with the second input member 12b and a large diameter portion slidably coupled within a reaction retainer 16. The large diameter portion of input member 12c is opposed at its rear face to a recessed bottom face of the reaction retainer 16 and at its front face to a reaction cushion disc 14.

The reaction retainer 16 is formed with a cylindrical portion extended therefrom and is integrally connected with the power piston 10. The reaction cushion disc 14 is coupled within the cylindrical portion of reaction retainer 16 and receives thereon the rear end of an output rod 15 which extends outwardly from the front housing shell to be engaged with a piston of a master cylinder (not shown). A reaction force acting on the output rod 15 is transmitted to the input rod 11 through the reaction cushion disc 14 and the input members 12a, 12b and 12c. A compression coil spring 28 is disposed between an annular reinforcement plate secured to the inner wall of the front housing shell and the reaction retainer 16 to bias the power piston 10 backward.

The first plunger 18 is formed with a projection 18a which is opposed to the corresponding recess 16a formed in the reaction retainer 16. A solenoid winding 17 is assembled within the power piston 10 in surrounding relationship with the first plunger 18.

As shown in FIG. 1, a potentiometer 81 is connected to the brake pedal 80 to detect a depression amount of the brake pedal 80 for producing an electric signal indicative of the detected depression amount. Thus, a depression speed of the brake pedal can be detected on a basis of the depression amount per a unit time.

In an inoperative condition of the brake booster, as shown in FIG. 2, there are provided a clearance A between the abutment face 12d of first input member 12a and the abutment face 25d of second cylindrical plunger 25, a clearance B between the projection 18a of first plunger 18 and the corresponding recess 16a of reaction retainer 16, a clearance $C_1$ between the large diameter portion of third input member 12c and the cushion disc 14, a clearance $C_2$ between the large diameter portion of third input member 12c and the recessed bottom face of reaction retainer 16, and a clearance D between the valve element 23a and valve part 10a for the vacuum control valve. The clearance A is determined in a predetermined value such that it becomes zero when the first and second plungers 18 and 25 are attracted by energization of the solenoid winding 17. The clearance B is determined to effect attraction of the first and second plungers 18 and 25. The clearance $C_2$ is determined in a predetermined value to define a retraction amount of the third input member 12c in backward movement of the power piston 10. The clearance D is determined to define the communication between the constant pressure chambers 6, 8 and the variable pressure chambers 7, 9 in backward movement of the power piston 10. Preferably, the clearance $C_2$ is determined to be larger than the clearance A, and the clearance B is determined to be larger than the clearance A Hereinafter, operation of the vacuum brake booster will be described in detail with reference to FIG. 4. When the brake pedal 80 is depressed by a driver, the input rod 11 is moved forward by the depression force applied thereto, and in turn, the input members 12a–12c are moved forward with the input rod 11. When the annular projection 12e of first input member 12a is engaged with the annular stepped portion 18e of first plunger 18, the first and second plungers 18 and 25 are unitedly moved forward, and the valve elements 23a and 23b are moved forward by the biasing force of coil spring 21. When the valve element 23a of the vacuum control valve is engaged with the valve part 10a of power piston 10, the variable pressure chambers 7 and 9 are isolated from the constant pressure chambers 6 and 8. When the first and second plungers 18 and 25 are further moved forward, the valve element 25a is disengaged from the valve element 23b to establish a communication of the variable pressure chambers 7 and 9 with the atmospheric air. This causes a difference in pressure between the constant pressure chambers 6, 8 and the variable pressure chambers 7, 9. In such an instance, the movable walls 4 and 5 are moved forward by a thrust force caused by the difference in pressure to effect forward movement of the power piston 10. Thus, the output rod 15 is applied with an amplified braking force from the power piston 10 through the reaction cushion disc 14. In this instance, the reaction cushion disc 14 is deformed by a reaction force applied from the output rod 15, and the braking output increases until the deformed portion of cushion disc 14 is brought into engagement with the large diameter portion of third input member 12c. That is to say, the reaction cushion disc 14 does not engage the third input member 12c until the input force is increased up to a value $f_2$ shown in FIG. 4. This causes the brake booster to produce a slight jumping output therefrom.

When the reaction cushion disc 14 is engaged with the third input member 12c at its deformed portion, the input members 12a–12c are moved backward by a reaction force applied from the reaction cushion disc 14, and in turn, the first and second plungers 18 and 25 are moved backward by the biasing force of coil spring 27. In this instance, the valve element 25a is engaged with the valve element 23b to interrupt the communication of the variable pressure chambers 7 and 9 with the atmospheric air. Thereafter, the vacuum control valve (10a, 23a) and the air control valve (25a, 23b) are alternately opened and closed to eliminate the clearances $C_1$ and D. Thus, as shown by a solid line "a" in FIG. 4, the output F of the brake booster is increased at a ratio defined by the pressure receiving area of the reaction cushion disc 14 relative to that of the large diameter portion of third input member 12c. After exceeded a saturation level, the output F of the brake booster is increased in accordance with an increase of the input force f.

When the depression of brake pedal 80 is released, the input members 12a–12c are moved backward by the reaction force applied thereto during which the vacuum control valve (10a, 23a) and the air control valve (25a, 23b) are alternately opened and closed. After the reaction force is eliminated, the input rod 11 is retracted by the biasing force of coil spring 24, and in turn, the second cylindrical plunger 25 is retracted by the biasing force of coil spring 27 so that the valve element 25a is engaged with the valve element 23b while the valve element 23a is separated from the valve part 10a of power piston 10 with the clearance D.

Assuming that the brake pedal 80 has been rapidly depressed in emergency situations, the depression speed of the brake pedal 80 detected by the potentiometer 81 exceeds a predetermined threshold value. In such an instance, the solenoid winding 17 is energized by the electric power under control of an electric controller (not shown) to attract the first plunger 18 thereby to effect automatic braking operation of the brake booster. When the input rod 11 is applied with an input $f_1$, the second cylindrical plunger 25 is moved forward with the first plunger 18 so that the clearance A becomes zero. As a result, the valve element 23a of the vacuum control valve is engaged with the valve part 10a of power piston 10, while the valve element 25a is disengaged from the valve element 23b to establish a communication of the variable pressure chambers 7 and 9 with the atmospheric air. This causes forward movement of the power piston 10. If the input rod 11 is continuously applied with the input $f_1$, the input members 12a–12c and input rod 11 are retracted by a reaction force applied from the reaction cushion disc 14 in the clearance A, and in turn, the valve part 10a and valve element 25a are brought into engagement with the valve elements 23a and 23b respectively. During such operation of the brake booster, the clearance $C_1$ becomes effective to increase the output F of the brake booster from a point $a_1$ to a point $b_1$ as shown by an arrow in FIG. 4. In this embodiment, the output defined by the points $a_1$ and $b_1$ is referred to an additional jumping amount.

Figure 4:
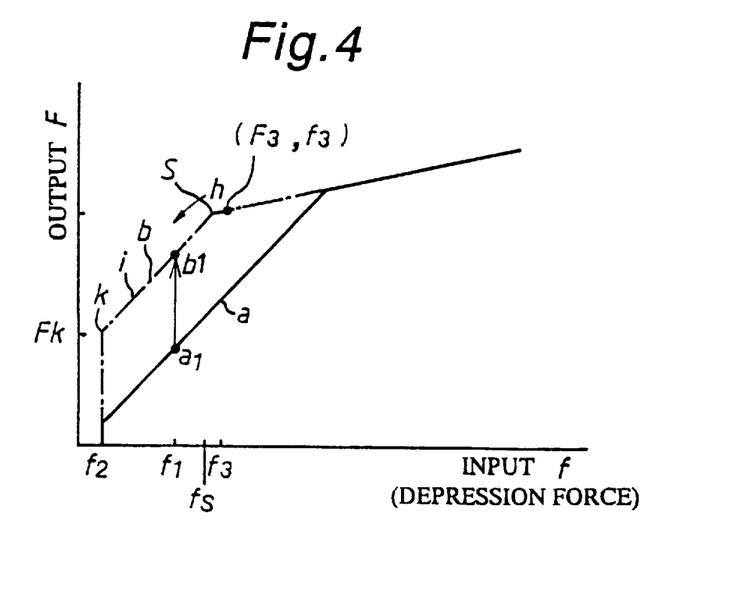
FIG. 4 is a graph illustrating an output characteristic of the brake booster.

When the input force is further increased in such a condition as described above, the output of the brake booster is increased in accordance with an increase of the input as shown by a dot-and-dash line b in FIG. 4. When the output is saturated at a point S, the air control valve (25a, 23b) is opened to maintain the communication of the variable pressure chambers 7 and 9 with the atmospheric air and is maintained in the open position while the reaction cushion disc 14 is compressed by the input applied from the input rod 11 through the input members 12a–12c.

When the brake pedal 80 is released in a condition where the output F of the brake booster was increased up to a level defined by a point ($F_3$, $f_3$) shown in FIG. 4, the input rod 11 is moved backward by the biasing force of coil spring 24, and in turn, the plungers 18 and 25 are moved backward together with the input members 12a–12c. As a result, the valve element 25a of second plunger 25 is engaged with the valve element 23b to interrupt the communication of the variable pressure chambers 7 and 9 with the atmospheric air, while the valve element 23a is separated from the valve part 10a of power piston 10 to communicate the variable pressure chambers 7 and 9 with the constant pressure chambers 6 and 8. This decreases the difference in pressure between the constant pressure chambers 6, 8 and the variable pressure chambers 7, 9. Thus, the output of the brake booster decreases as shown by the dot-and-dash line b in FIG. 4, and the movable walls 4, 5 and power piston 10 are retracted to their initial positions.

During backward movement of the input rod 11 described above, the release amount of the brake pedal 80 is detected by the potentiometer 81. If the detected release amount is more than a predetermined value, the solenoid winding 17 is deenergized under control of the controller (not shown) to permit backward movement of the plungers 18 and 25 caused by the biasing force of coil spring 27. As a result, the abutment face 25d of plunger 25 is separated in the clearance A from the abutment face 12d of first input member 12a as in the inoperative condition of the brake booster.

As mentioned in the description of the prior art, the output of the conventional vacuum brake booster in automatic braking operation is increased as shown by the broken line in FIG. 7. After increased up to a level "c", the output of the brake booster is increased at a small gradient in accordance with an increase of the depression force of the brake pedal. This means that the depression stroke of the brake pedal is reduced in the automatic braking operation. In general, the relative movement of the valve plunger to the power piston in the brake booster is restricted in a predetermined small value by means of a restriction member. When the variable pressure chamber is fully supplied with the atmospheric air in the automatic braking operation, the movement of the power piston is arrested. In this instance, the depression stroke of the brake pedal is limited in the predetermined small value defined by the restriction member. When the brake pedal is released in the automatic braking operation, the return stroke of the brake pedal is limited in a small value. It is, therefore, very difficult to detect the release amount of the brake pedal for determining the driver's intent.

In contrast with the prior art brake booster, the vacuum brake booster of the present invention is characterized in that when the brake pedal 80 is released in the automatic braking operation, the plungers 18 and 25 are moved backward with the first input member 12 in response to retraction of the input rod 11 in the activated condition of the solenoid winding 17 to engage the valve element 25 with the valve element 23b and to disengage the valve element 23a from the valve part 10a of power piston 10 thereby to decrease the difference in pressure between the constant and variable pressure chambers. With such an arrangement of the component parts as shown in FIG. 2, the return stroke of the brake pedal is obtainable in a sufficient amount, and the release amount of the brake pedal 80 can be detected by the potentiometer 81 in a simple manner for control of the automatic braking actuation system.

Although in the above embodiment, the potentiometer 81 has been adapted to detect a depression amount of the brake pedal, the potentiometer 81 may be replaced with detection means for detecting movement of the input rod 11 or the movable walls 4 and 5.

Figure 5:
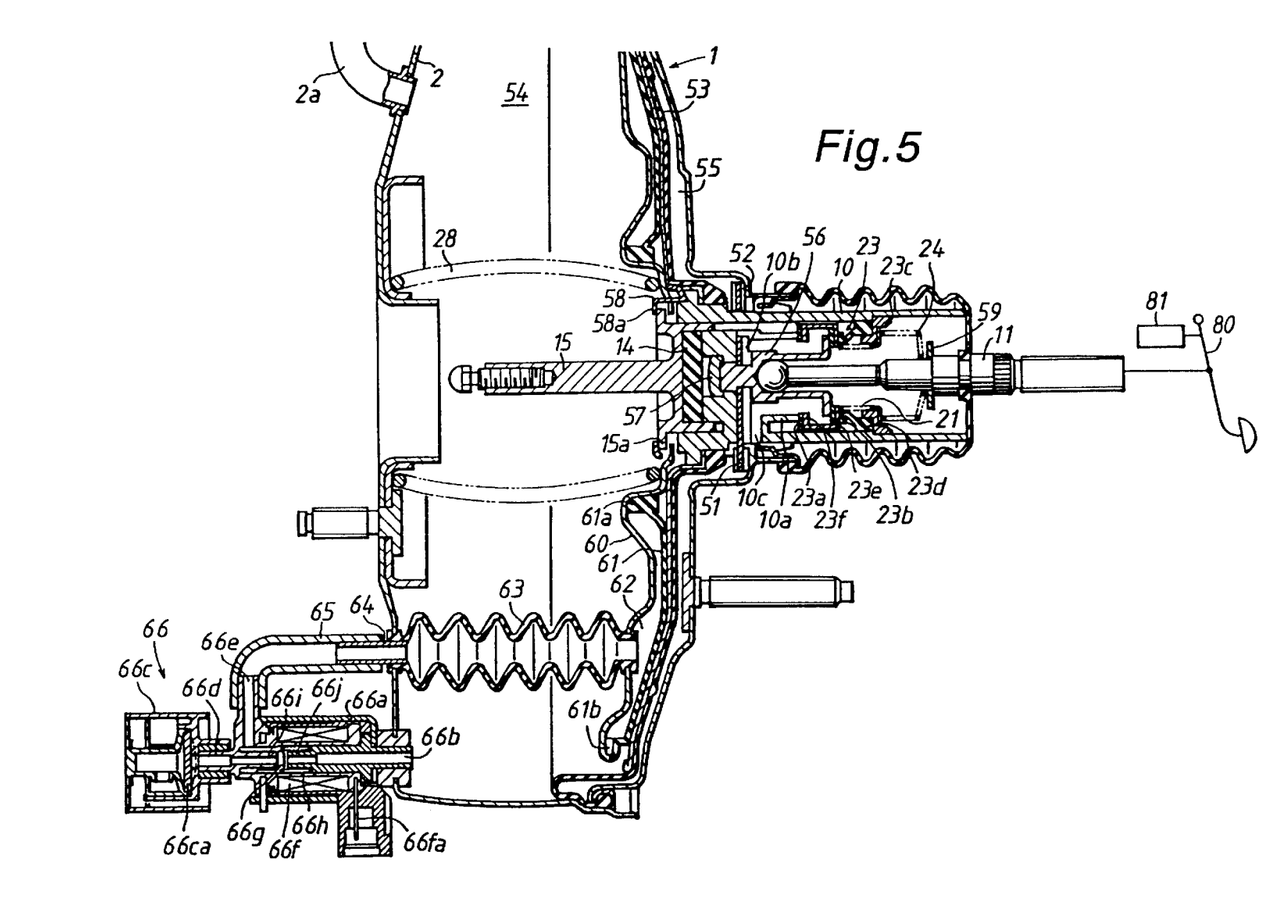
FIG. 5 is a sectional view of another embodiment of the brake booster shown in FIG. 1.

Illustrated in FIG. 5 is another embodiment of a vacuum brake booster 1 according to the present invention, wherein the same component parts as those in the embodiment of FIG. 1 are designated by the same reference numerals. The interior of the housing assembly 2 of the brake booster 1 is subdivided into a constant pressure chamber 54 and a variable pressure chamber 55 by means of a movable wall 53. The constant pressure chamber 54 is applied with a negative pressure from the intake manifold (not shown) through the inlet connector 2a. The brake booster 1 includes a power piston 10 of synthetic resin mounted within the housing assembly 2. The movable wall 53 is composed of an annular support plate fixed at its inner peripheral portion to an annular shoulder of power piston 10 and a diaphragm member attached to the rear face of the annular support plate. The diaphragm member of movable wall 53 has an inner peripheral thick rim coupled over the annular shoulder of power piston 10. The brake booster 1 is provided with the input rod 11 which is connected at its rear end to the brake pedal 80 and at its front end to a first input member 56. The first input member 56 is axially slidably coupled within a stepped bore of power piston 10 and connected with a second input member 57 which is axially slidably coupled within a large diameter portion of the stepped bore. The first and second input members 56 and 57 are applied with a depression force of the brake pedal 80 through the input rod 11 to transmit the depression force to the reaction cushion disc 14. The output rod 15 is integrally formed at its rear end with a cylindrical portion which is coupled within the power piston 10 and contains the reaction cushion disc 14. The output rod 15 is operatively connected to the piston of the master cylinder (not shown). In operation, the output rod 15 is moved forward by the depression force of the brake pedal 80 through the reaction cushion disc 14 to actuate the piston of the master cylinder. A stopper member 58 is fixed to the annular shoulder of power piston 10 and engaged at its radial projection 58a with an annular flange integrally formed with the cylindrical portion of output rod 15.

The input rod 11 is provided thereon with an annular retainer 59 fixed thereto. An annular retainer 23c is fixedly coupled within a cylindrical portion of power piston 10, and an annular sealing member 23d is coupled with the annular retainer 23c and pressed into contact with the inner wall of the cylindrical portion of power piston 10. A compression coil spring 24 is disposed between the annular retainer 23c and retainer 59 to bias the input rod 11 rearward. An annular retainer 23e is secured to the front end of the sealing member 23d and fixedly coupled with a cylindrical valve member 23f. An annular valve element 23a is secured to an inward flange of the cylindrical valve member 23f, and an annular valve element 23b is secured to the annular retainer 23e. A compression coil spring 21 is disposed between the annular retainer 23c and retainer 23e to bias the valve member 23f forward. In a released condition of the brake pedal, the valve element 23b is maintained in engagement with an annular flange of a cylindrical portion integrally formed with the first input member 56 under the load of coil spring 21, while the valve element 23a is separated from a cylindrical valve part 10a of power piston 10. When the input rod 11 is moved forward by a depression force of the brake pedal applied thereto, the valve element 23a is engaged with the valve part 10a of power piston 10, while the valve element 23b is disengaged from the annular flange of the cylindrical portion of first input member 56. A key member 51 is fixedly coupled within a radial key groove 10b formed in the power piston 10 and engaged with the inner wall of the housing assembly 2 through a damper member 52. In addition, the power piston 10 is formed therein with an air passage 10c.

Assembled within the constant pressure chamber 54 is an ancillary movable wall 60 which is mounted on the power piston 10 to be engaged at its inner periphery with the annular flange 15a of output rod 15. The movable wall 60 is coupled with a diaphragm member 61 in an air-tight manner to form an ancillary variable pressure chamber 62. The movable wall 60 is loaded backward by means of a compression coil spring 28 carried by the front housing shell. The diaphragm member 61 has an inner peripheral thick rim 61a fixedly coupled with an annular shoulder of movable wall 60 and an outer peripheral thick rim 61b fixedly coupled with an outer peripheral rim of movable wall 60. A bellows tube 63 is connected in an air-tight manner at its one end with the movable wall 60 and at its other end with the front housing shell. The bellows tube 63 is communicated with a solenoid valve assembly 66 through an air tube 64 and an air pipe 65.

The solenoid valve assembly 66 has a valve housing 66a formed with a constant pressure port 66b in open communication with the constant pressure chamber 54, an air port 66d in open communication with an air cleaner 66c contained therein with a cleaner element 66ca, and a variable pressure port 66e in open communication with the ancillary variable pressure chamber 62 through the bellows tube 63. A solenoid winding 66f is assembled within the valve housing 66a in surrounding relationship with the constant pressure port 66b and connected at its terminal 66fa to an electronic controller (not shown) to be applied with electric power under control of the controller. A valve plunger 66g is disposed between the air port 66d and constant pressure port 66b and is normally maintained in engagement with an air valve seat 66i under the load of a compression coil spring 66h carried by the constant pressure port 66b. In an inoperative condition of the solenoid valve assembly 66, the ancillary variable pressure chamber 62 is communicated with the constant pressure chamber 54 through the bellows tube 63, air tube 64, air pipe 65, variable pressure port 66e and constant pressure port 66b. When the solenoid winding 66f is energized by the electric power applied under control of the controller, the valve plunger 66g is disengaged from the air valve seat 66i to introduce the atmospheric air into the ancillary variable pressure chamber 62 through the air cleaner 66c, air port 66d, variable pressure port 66e, air pipe 65, air tube 64 and bellows tube 63, while the valve plunger 66g is engaged with a valve seat 66j to interrupt the communication between the ancillary variable pressure chamber 62 and the constant pressure chamber 54.

In this embodiment, the potentiometer 81 is connected to the brake pedal 80 as in the embodiment shown in FIG. 1 to detect a depression amount of the brake pedal 80 for producing an electric signal indicative of the detected depression amount. Thus, a depression speed of the brake pedal can be detected on a basis of the depression amount per a unit time.

Hereinafter, operation of the brake booster shown in FIG. 5 will be described in detail with reference to FIG. 6. In a released condition of the brake pedal 80, the valve element 23b is maintained in engagement with the valve part of first input member 56, while the valve element 23a is separated from the valve part 10a of power piston 10 to maintain the communication between the constant pressure chamber 54 and variable pressure chamber 55. When the brake pedal 80 is depressed by the driver, the input rod 11 is moved forward by the depression force applied thereto, and in turn, the input members 56 and 57 are moved forward with the input rod 11. During forward movement of the input members 56 and 57, the valve elements 23a and 23b are moved forward with the input member 56 under the load of coil spring 21, and in turn, the valve element 23a is engaged with the valve part 10a of power piston 10 to interrupt the communication between the constant and variable pressure chambers 54 and 55.

When the first input member 56 is further moved forward, the valve part of input member 56 is disengaged from the valve element 23b to establish a communication of the variable pressure chamber 55 with the atmospheric air. This causes a difference in pressure between the constant and variable pressure chambers 54 and 55. At this stage, the movable wall 53 is moved forward by a thrust force caused by the difference in pressure to effect forward movement of the power piston 10. Thus, the output rod 15 is applied with an amplified braking force from the power piston 10 through the reaction cushion disc 14. In this instance, the reaction cushion disc 14 is deformed by a reaction force applied from the output rod 15, and the braking output increases until the deformed portion of cushion disc 14 is brought into engagement with the second input member 57. When the reaction cushion disc 14 is engaged with the second input member 57 at its deformed portion, the input members 56 and 57 are moved backward by a reaction force applied from the reaction cushion disc 14. In this instance, the valve part of first input member 56 is engaged with the valve element 23b to interrupt the communication of the variable pressure chamber 55 with the atmospheric air. Thereafter, the vacuum control valve (23a) and the air control valve (23b) are alternately opened and closed to control operation of the brake booster in accordance with the input applied from the brake pedal. During such operation, the reaction cushion disc 14 acts to balance the reaction force applied to the output rod 15 with the depression force of the brake pedal applied to the input member 57.

Figure 6:
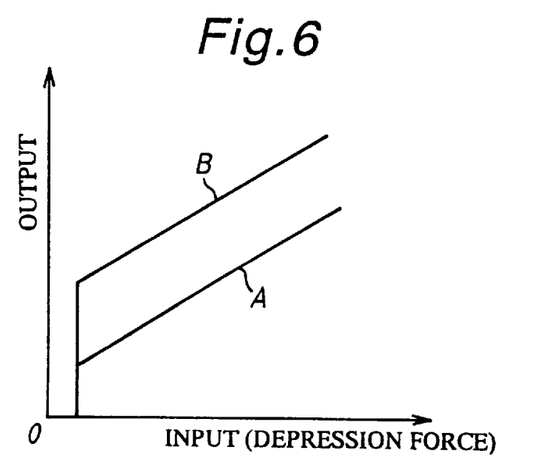
FIG. 6 is a graph illustrating an output characteristic of the embodiment shown in FIG. 5.

Assuming that the brake booster has been operated in a condition where the solenoid valve assembly 66 is maintained in an inoperative condition, the output of the brake booster increases in accordance with an increase of the depression force of the brake pedal as shown by a characteristic line A in FIG. 6. Assuming that the brake pedal 80 has been rapidly depressed in emergency situations, the depression speed of the brake pedal detected by the potentiometer 81 exceeds a predetermined threshold value. In such an instance, the solenoid winding 66f is energized by the electric power applied thereto under control of the controller (not shown) to attract the valve plunger 66g thereby to effect automatic braking operation of the brake booster. When the valve plunger 66g is disengaged from the air valve seat 66i and engaged with the valve seat 66j to interrupt the communication between the constant pressure chamber 54 and the ancillary variable pressure chamber 62, the atmospheric air is introduced into the ancillary variable pressure chamber 62. This cause a difference in pressure between the constant pressure chamber 54 and the ancillary variable pressure chamber 62. In this instance, the ancillary movable wall 60 is moved forward by a thrust force caused by the difference in pressure and is engaged with the annular flange 15a of output rod 15 to effect forward movement of the output rod 15. Under such a condition, a reaction force from the output rod 15 does not act on the reaction cushion disc 14. As a result, the output of the brake booster increases in accordance with an increase of the depression force of the brake pedal as shown by a characteristic line B in FIG. 6.

When the depression of the brake pedal 80 is released, the input members 56 and 57 are moved backward in response to retraction of the input rod 11. As a result, the valve part of input member 56 is engaged with the valve element 23b to interrupt the communication of the variable pressure chamber 55 with the atmospheric air, while the valve element 23a is separated from the valve part of power piston 10 to communicate the constant pressure chamber 54 with the variable pressure chamber 55. This decreases the difference in pressure between the constant and variable pressure chambers 54 and 55. Thus, the power piston 10 is retracted to its initial position under the load of coil spring 28 to decrease the output of the brake booster.

During backward movement of the input rod 11 described above, the release amount of the brake pedal 80 is detected by the potentiometer 81. If the detected release amount is more than a predetermined value, the solenoid winding 66f is deenergized under control of the controller (not shown) to permit backward movement of the valve plunger 66g caused by the biasing force of coil spring 66h. As a result, the valve plunger 66g is engaged with the valve seat 66i to communicate the ancillary variable pressure chamber 62 with the constant pressure chamber 54 and to interrupt the communication of the ancillary variable pressure chamber 62 with the atmospheric air. This decreases the difference in pressure between the ancillary variable pressure chamber 62 and constant pressure chamber 54 and causes backward movement of the ancillary movable wall 60 under the load of coil spring 28. In turn, the ancillary movable wall 60 is disengaged from the annular flange 15a of output rod 15 and returned to the initial position. Thus, the output of the brake booster is decreased in response to deenergization of the solenoid winding 66f as shown by the characteristic line B in FIG. 6.

As is understood from the foregoing description, the output of the brake booster can be decreased even when the ancillary movable wall 60 is moved forward in the automatic braking operation. Although in the embodiment, the potentiometer 81 has been adapted to detect a depression amount of the brake pedal, the potentiometer 81 may be replaced with detection means for detecting movement of the input rod 11 or the movable wall 53.

What is claimed is:

1. A vacuum brake booster for an automotive vehicle, comprising:

a housing having an interior which is subdivided into a constant pressure chamber and a variable pressure chamber by a movable wall;

a power piston carried by said movable wall for movement with the movable wall;

an input member assembled within said power piston for connection to a brake pedal of the vehicle to be moved in a forward direction through depression of the brake pedal and in a backward direction upon release of the brake pedal;

valve means for selectively communicating said variable pressure chamber with said constant pressure chamber or with atmospheric air in response to depression of the brake pedal;

an output member coupled with said power piston to be moved in the forward direction by a thrusting force caused by movement of the movable wall in the forward direction; and an actuator for applying a thrusting force to said output member when activated under control of a controller, said controller including detection means for detecting an amount of depression of said brake pedal, calculation means for calculating a depression speed of said brake pedal based on the amount of depression detected by said detection means, and control means for activating said actuator when the calculated depression speed of said brake pedal exceeds a predetermined value;

said valve means effecting communication between said variable pressure chamber and said constant pressure chamber in a condition in which said brake pedal is released during activation of said actuator and said control means effecting deactivation of said actuator when an amount of release of the brake pedal detected by said detection means is more than a predetermined value.

2. A vacuum brake booster for an automotive vehicle, comprising:

a housing having an interior which is subdivided into a constant pressure chamber and a variable pressure chamber by a movable wall;

a power piston carried by said movable wall for movement with the movable wall;

an input member assembled within said power piston for connection to a brake pedal of the vehicle to be moved forward by depression of the brake pedal and backward upon release of the brake pedal;

an output member coupled with said power piston to be moved forward by a thrusting force caused by forward movement of said movable wall;

a plunger assembly axially slidably mounted within said power piston to be moved forward by engagement with said input member;

valve means assembled within said power piston and cooperable with said plunger assembly for permitting communication between said constant and variable pressure chambers and interrupting communication of said variable pressure chamber with atmospheric air in a released condition of the brake pedal, and for establishing communication of said variable pressure chamber with atmospheric air and interrupting communication between said constant and variable pressure chambers in response to forward movement of said plunger assembly;

an actuator assembled within said power piston to effect forward movement of said plunger assembly when activated under control of a controller, said controller including detection means for detecting an amount of depression of said brake pedal, calculation means for calculating a depression speed of said brake pedal based on the amount of depression of the brake pedal detected by said detection means, and control means for activating said electric actuator when the depression speed of the brake pedal calculated by the calculation means exceeds a predetermined value;

said input member being positioned to be moved backward in a condition in which said brake pedal is released during activation of said actuator; and said control means effecting deactivation of said actuator when an amount of release of said brake pedal detected by said detection means is more than a predetermined value.

3. A vacuum brake booster for an automotive vehicle as claimed in claim 2, wherein said input member is axially slidably disposed within said plunger assembly, and wherein said plunger assembly is arranged to be engaged with said input member when moved forward by activation of said actuator.

4. A vacuum brake booster for an automotive vehicle as claimed in claim 3, wherein said actuator is an electric actuator.

5. A vacuum brake booster for an automotive vehicle as claimed in claim 4, wherein said electric actuator includes a solenoid winding assembled within said power piston in surrounding relationship to said plunger assembly.

6. A vacuum brake booster for an automotive vehicle as claimed in claim 2, wherein a forward end of said input member has a back surface spaced a predetermined distance from a surface of said power piston which faces the back surface of said input member to permit backward movement of said input member when the brake pedal is released during activation of said actuator.

7. A vacuum brake booster for an automotive vehicle, comprising:

a housing having an interior subdivided into a constant pressure chamber and a first variable pressure chamber by a first movable wall;

a power piston carried by said movable wall for movement with the movable wall;

an input member assembled within said power piston for connection to a brake pedal of the vehicle to be moved forward by depression of the brake pedal and backward upon release of the brake pedal;

an output member coupled with said power piston to be moved forward by a thrusting force caused by forward movement of said movable wall;

valve means assembled within said power piston and cooperable with said input member for permitting communication between said constant pressure chamber and said first variable pressure chamber while interrupting communication of said first variable pressure chamber with atmospheric air in a released condition of said brake pedal, and for establishing communication of said first variable pressure chamber with atmospheric air while interrupting communication between said constant pressure chamber and said first variable pressure chamber in response to forward movement of said input member;

a second moveable wall disposed within said constant pressure chamber and carried by said power piston for engagement with said output member at an inner periphery of said second movable wall;

a diaphragm member coupled with said second movable wall in an air-tight manner to form a second variable pressure chamber;

electrically operated changeover valve means mounted on said housing to effect communication of said second variable pressure chamber with said constant pressure chamber in a deactivated condition and to effect communication of said second variable pressure chamber with atmospheric air when activated under control of an electronic controller, said electronic controller including detection means for detecting an amount of depression of the brake pedal, calculation means for calculating a depression speed of said brake pedal based on the amount of depression of the brake pedal detected by said detection means, and control means for activating said changeover valve means when the depression speed of the brake pedal calculated by the calculation means exceeds a predetermined value;

said input member being positioned to move backward in a condition in which the brake pedal is released during activation of said actuator; and said control means effecting deactivation of said changeover valve means when an amount of release of the brake pedal detected by said detection means is more than a predetermined value.

8. A vacuum brake booster for an automotive vehicle as claimed in claim 7, wherein said electrically operated changeover valve means includes a bellows tube having one end connected to said second movable wall for communication with said second variable pressure chamber and a solenoid valve assembly mounted on said housing to connect said bellows tube to said constant pressure chamber in a deactivated condition and to connect said bellows tube with atmospheric air when activated under control of said electronic controller.

* * * * *